United States Patent
Anderson

(10) Patent No.: US 11,269,621 B2
(45) Date of Patent: Mar. 8, 2022

(54) OBFUSCATION FOR PROTECTION OF STREAMING MEDIA AND OTHER DATA FLOWS

(71) Applicant: ARRIS Enterprises, Inc., Suwanee, GA (US)

(72) Inventor: Lex Aaron Anderson, Auckland (NZ)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 15/007,482

(22) Filed: Jan. 27, 2016

(65) Prior Publication Data

US 2016/0218872 A1   Jul. 28, 2016

Related U.S. Application Data

(60) Provisional application No. 62/108,272, filed on Jan. 27, 2015.

(51) Int. Cl.
| | |
|---|---|
| *G06F 8/71* | (2018.01) |
| *G06F 21/14* | (2013.01) |
| *H04L 9/14* | (2006.01) |
| *H04L 9/06* | (2006.01) |
| *H04L 9/00* | (2022.01) |

(52) U.S. Cl.
CPC ............... *G06F 8/71* (2013.01); *G06F 21/14* (2013.01); *H04L 9/00* (2013.01); *H04L 9/065* (2013.01); *H04L 9/14* (2013.01); *H04L 2209/16* (2013.01); *H04L 2209/30* (2013.01); *H04L 2209/34* (2013.01); *H04L 2209/60* (2013.01)

(58) Field of Classification Search
CPC ........... H04L 9/0869; G06F 8/71; G06F 21/14
USPC ........................................................... 380/28
See application file for complete search history.

(56) References Cited

U.S. PATENT DOCUMENTS

| | | | | |
|---|---|---|---|---|
| 6,779,114 B1* | 8/2004 | Chow | ...................... | G06F 21/14 713/189 |
| 7,757,097 B2* | 7/2010 | Atallah | ............... | G06F 12/1408 713/176 |
| 2007/0033419 A1* | 2/2007 | Kocher | ................... | G06F 21/10 713/193 |

(Continued)

FOREIGN PATENT DOCUMENTS

| | | | |
|---|---|---|---|
| CN | 100504818 | 6/2009 | |
| JP | 2007-304726 A | 11/2007 | |
| WO | WO-0077596 A1 * | 12/2000 | ........... H04L 9/0625 |

OTHER PUBLICATIONS

D. Barrington, "Bounded-width polynomial-size branching programs recognize exactly those languages in NC1", In Proceedings of the 18th Annual ACM Symposium on Theory of Computing, 1986, pp. 1-5.

(Continued)

*Primary Examiner* — Brandon S Hoffman
(74) *Attorney, Agent, or Firm* — Chernoff, Vilhauer, McClung & Stenzel, LLP

(57) ABSTRACT

A method is provided for obfuscating program code to prevent unauthorized users from accessing video. The method includes receiving an original program code that provides functionality. The original program code is transformed into obfuscated program code defining a randomized branch encoded version of the original program code. The obfuscated program code is then stored, and a processor receiving input video data flow uses the obfuscated program code to generate an output data flow.

10 Claims, 16 Drawing Sheets

(56) References Cited

U.S. PATENT DOCUMENTS

2008/0208560 A1* 8/2008 Johnson .................. G06F 21/14
703/22
2010/0250906 A1 9/2010 Singh et al.

OTHER PUBLICATIONS

Y. Ishai,, et al., "Founding cryptography on oblivious transfer-efficiently" Advances in Cryptology—CRYPTO 2008, pp. 1-43, 2008.
M. Ben-Or, et al., "Everything provable is provable in zero-knowledge" In Advances in Cryptology—Crypto '88, 1990, pp. 37-56.
D. Boneh, Barrington's theorem using matrices in SL_2(Z) 2013. URL <http://crypto.standfor.edu/~dabo/pubs/papers/barrington.html>. Dec. 7, 2013.
S. Garg, et al., "Candidate indistinguishability obfuscation and functional encryption for all circuits" Proceedings of FOCA 2013, URL <http://lredirect.subscribe.ru/_/-/eprint.iacr.org/2013/451.pdf.
J. Kilian, "Founding cryptography on oblivious transfer" In Proceedings of the twentieth annual ACM symposium on Theory of computing, pp. 20-31, 1988.
Official Action, Re: Korean Application No. 10-2017-7023923, dated Oct. 12, 2018.
Chinese Office Action (with English translation) dated Mar. 3, 2020 for Chinese Patent Appln No. 201680007548.6.

\* cited by examiner

HIGH LEVEL CODE — 40

```
INT AND(CONST INT X1, CONST INT X2)
{
    INT Y = X1 & X2;
    RETURN Y;
}
```

ASSEMBLY CODE — 41

```
PUSHL   %EBP
MOVL    %ESP , %EBP
SUBL    $8 , %ESP
MOVL    12(%EBP) , %EAX
MOVL    8(%EBP) , %ECX
MOVL    %EAX , -4(%EBP)
MOVL    %ECX , -8(%EBP)
ANDL    -8(%EBP) , %EAX
ADDL    -4(%EBP) , %EAX
POPL    $8 , %ESP
RETL    %EBP
```

OBFUSCATION FOR PROTECTION OF STREAMING MEDIA AND OTHER DATA FLOWS

CLAIM OF PRIORITY

This Application claims priority under 35 U.S.C. § 119(e) from earlier filed U.S. Provisional Application Ser. No. 62/108,272 filed on Jan. 27, 2015 and incorporated herein by reference in its entirety.

BACKGROUND

Field of the Invention

The present invention relates to obfuscation of program code to protect program code and resultant data flows. In particular, the present invention relates to protecting streaming media and/or other data flow systems against unauthorized use when intercepted.

SUMMARY

It is an object of the invention to provide and/or use obfuscate code.

In one aspect there is a method of obfuscating program code comprising: receiving, at a processor, original program code that provides a functionality, in the processor, transforming the original program code into obfuscated, program code defining a randomized branch encoded version of the original program code, transferring the obfuscated program code, or storing the obfuscated, program code for later transfer, from the processor to a processing system that receives input data flow and uses the obfuscated program code to generate output data flow, wherein the processor implements randomized branch encoding to transform the original program code into obfuscated program code.

Optionally, implementing randomized branch encoding comprises creating the original program code functionality from a randomized branching program, the randomized branching program being created by the steps of: combining layered branching programs with functionality corresponding to code elements of the original program code, and randomizing the paths between nodes of adjacent layers in the layered branching programs.

Optionally, the method further comprises converting the randomized branching program to program code to form the obfuscated program code, wherein the obfuscated program code provides the same functionality as the original program code.

Optionally, the randomized branching program is created by the further step of randomizing the input encodings of the layered branching programs.

Optionally, the randomized branching program is created by the further step of randomizing the output encodings of the layered branching programs.

Optionally, randomizing the input or output encodings comprises modifying layers in the layered branching programs in accordance with: randomized encodings on input data flows, and/or desired randomized encodings on output data flows.

Optionally, the method further comprises transforming the randomized branching program to program code to form the obfuscated program code, wherein the obfuscated program code provides a different functionality as the original program code to process input data flows with randomized encodings.

Optionally, a layered branching program has one or a combination of the following functions, or some logical equivalent of them: IDENTITY, NOT, AND, OR, XOR, ADD, MUL.

Optionally, the processor implements matrix calculations to implement randomized branch encoding to transform the original program code into obfuscated program code.

Optionally, implementing randomized branch encoding comprises creating the original program code functionality using matrix calculations that implement the randomized branch encoding.

Optionally, the matrix calculations can be implemented as program code, which is an obfuscated version of the original program code.

Optionally, the obfuscated program code provides one or more of the following functionalities: decryption of input data flow, decompression of input data flow, decoding of input data flow.

Optionally, the input data flow is an encrypted media stream comprising media content and the obfuscated program code functionality decrypts the media stream.

Optionally, the input data flow is a compressed media stream comprising media content and the obfuscated program code functionality decompresses the media stream.

Optionally, the input data flow is an encoded media stream comprising media content and the obfuscated program code functionality decodes the media stream.

In another aspect there is a computer system for obfuscating program code comprising: an input and/or data repository for original program code that provides a functionality, and a processor in communication with the input and/or data repository, wherein the processor is configured to obfuscate program code according to the method of any one of the paragraphs above.

Optionally the computer system comprises an output for transferring the obfuscated program code to a data flow receiver.

Optionally, the data flow receiver is a media player.

Also described is a method for generating an output data flow from an input data flow comprising: receiving the input data flow at a processor, executing program code in the processor that takes the input data flow and generates output data flow, wherein the program code is obfuscated program code defining a randomized branch encoded version of original program code that provides a functionality, the obfuscated program code being transformed from the original program code using randomized branch encoding.

Optionally, the randomized branch encoded version of the original program code is created from a randomized branching program comprising layered branching programs with functionality corresponding to code elements of the original program code, and randomized paths between nodes of adjacent layers in the layered branching programs.

Optionally, the randomized branching program further comprises randomized input encodings on the layered branching programs.

Optionally, the randomized branching program further comprises randomized output encodings on the layered branching programs.

Optionally, the obfuscated program code has a functionality that: decrypts input data flow, decompresses input data flow, and/or decodes input data flow, to generate output data flow.

Optionally, the input data flow is an encrypted media stream comprising media content and the obfuscated program code functionality decrypts the media stream.

Optionally, the input data flow is a compressed media stream comprising media content and the obfuscated program code functionality decompresses the media stream.

Optionally, the input data flow is an encoded media stream comprising media content and the obfuscated program code functionality decodes the media stream.

Also described is a data flow receiver for generating an output data from an input data flow comprising: an input and/or data repository for an input data flow, a processor in communication with the input and/or data repository, program code, that provides a functionality, in the processor and/or data repository, wherein the processor is configured to: receive the input data flow from the input and/or data repository, and execute the program code to take the input data flow and generates output data flow, wherein the program code is obfuscated program code defining a randomized branch encoded version of original program code that provides a functionality, the obfuscated program code being transformed from the original program code using randomized branch encoding.

Optionally, the randomized branch encoded version of the original program code is created from a randomized branching program comprising layered branching programs with functions corresponding to code elements of the original program code, and randomized the paths between nodes of adjacent layers in the layered branching programs.

Optionally, the obfuscated program code provides the same functionality as the original program code.

Optionally, the randomized branching program further comprises randomized input encodings on the layered branching programs.

Optionally, the randomized branching program further comprises randomized output encodings on the layered branching programs.

Optionally, the randomized input or output encodings comprise modifying layers in the layered branching programs in accordance with: randomized encodings on input data flows, and/or desired randomized encodings on output data flows.

Optionally, the obfuscated program code provides a different functionality as the original program code to process input data flows with randomized encodings.

Optionally, a layered branching program has one or a combination of the following functions, or some logical equivalent of them: IDENTITY, NOT, AND, OR, XOR, ADD, MUL.

Optionally, the obfuscated program code has a functionality that: decrypts the input data flow, decompresses the input data flow, and/or decodes the input data flow, to generate the output data flow.

Optionally, data flow receiver is a media player, the input data flow is an encrypted media stream comprising media content and the obfuscated program code functionality decrypts the media stream.

Optionally, data flow receiver is a media player, the input data flow is a compressed media stream comprising media content and the obfuscated program code functionality decompresses the media stream.

Optionally, data flow receiver is a media player, the input data flow is an encoded media stream comprising media content and the obfuscated program code functionality decodes the media stream.

BRIEF DESCRIPTION OF THE DRAWINGS

Embodiments will be described with reference to the following drawings, of which:

FIG. 4 shows high level code compiled to assembly code.

DETAILED DESCRIPTION

General Overview

Figure 1A:
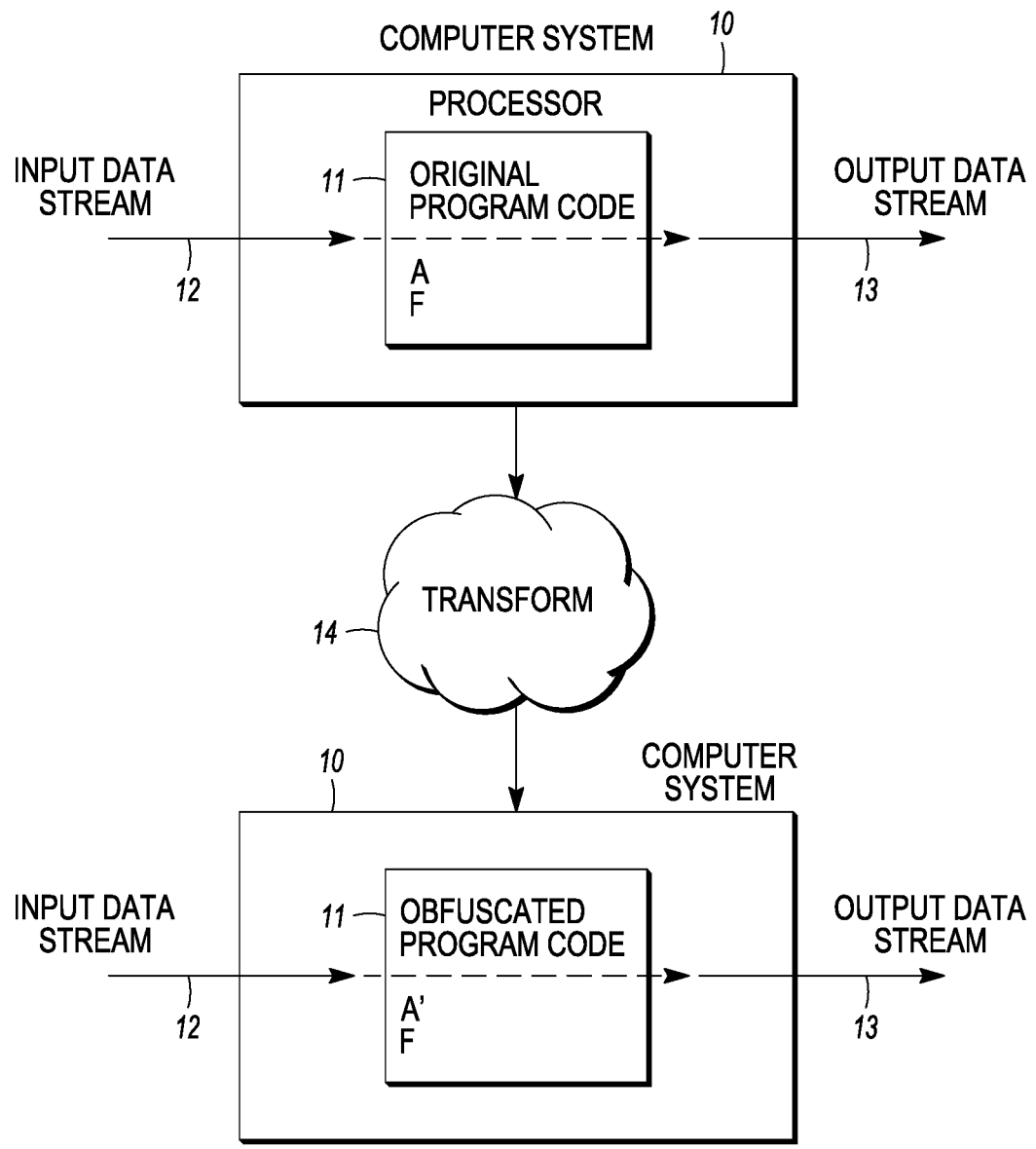
FIG. 1A shows a computer system executing an algorithm for processing a data flow, and a computer system executing a transformed version of the algorithm with the same functionality but which has obfuscated code and data flow.

In computer systems, input data flows are processed by program code that defines algorithms with functionality to generate output data flows. For example, program code might decrypt incoming encrypted data flows to generate outgoing data flows that are decrypted.

Examples of systems that implement such program code are:

Streaming media delivery systems that deliver encrypted media content, which is received by a media player comprising program code that decrypts the media stream and outputs the media content.

Document management systems, where documents are shared between authorised parties.

Media or software license management, where verification of licenses is required.

Media players in a web browser or other untrusted platform.

More generally, a data flow receiver that receives a stream of encrypted data and contain program code to decrypt that stream to provide unencrypted output, or any system on an untrusted platform where the program code needs to obfuscated to hide the functionality from untrusted parties.

The embodiments described herein enable obfuscation of the program code and/or resultant internal data flows during execution of the program code to generate output data flow from input data flows. The program code is obfuscated using randomized branch encoding to transform the (original) program code into obfuscated program code. Optionally, embodiments also enable further modification of the program code to take randomized input encodings (and optionally to provide randomized output encodings) to provide further obfuscation.

Further embodiments enable subsequent use of the obfuscated program code within a data flow receiver (such as a media player), so that the program code functionality and/or the content (such as media content) in the input data flow cannot be extracted even if the data flow receiver is attacked by an adversary. The program code is obfuscated in such a manner that even if the obfuscated program code is inspected, its functionality cannot be interpreted without significant computational effort, and if the internal data flows within the program code as it executes are examined, the content of the input data flow cannot be extracted without significant computational effort.

As an example (and to be described further later in respect of FIGS. 8 to 13), in a streaming media delivery system, a media server delivers media content in encrypted and compressed media streams to subscribers (end users) who wish to view the media content. The subscriber's media player receives a media stream (embodying media content) as input data flow and has program code embodying algorithms/functionality to process the media stream (including decrypting and decompressing the media stream/input data flow) to generate decrypted and decompressed output data flows embodying the media content that can be delivered to an audiovisual system for the user to view the media content. The media stream is encrypted to prevent unauthorized parties (i.e. nonsubscribers) being able to view the media content, even if they can intercept the media stream prior to arriving at the media player.

Therefore, the encryption of media streams provides a degree of protection against an adversary which intercepts the media stream. If they do so, they cannot access the media content, without the decryption key and algorithm. However, once the media stream has reached a subscriber's media player, the media player and/or audiovisual system can be compromised by the subscriber or other adversarial party to receive the unencrypted data flows and/or examine and reverse engineer the program code functionality. This enables the media content or future streams containing media content to be extracted, stored and used in an unauthorized manner. Embodiments described herein address this by enabling the generation and use of obfuscated program code in the media player to make it more difficult for an adversary to reverse engineer the program code functionality and/or examine internal data flows, even if they attack the media player.

Embodiments described herein will be focused on streaming media delivery systems, although embodiments can be applied to other applications such as those listed above.

Program Code and Data Flow Obfuscation to Protect Data Flows 2.1 Overview

Figure 1B:
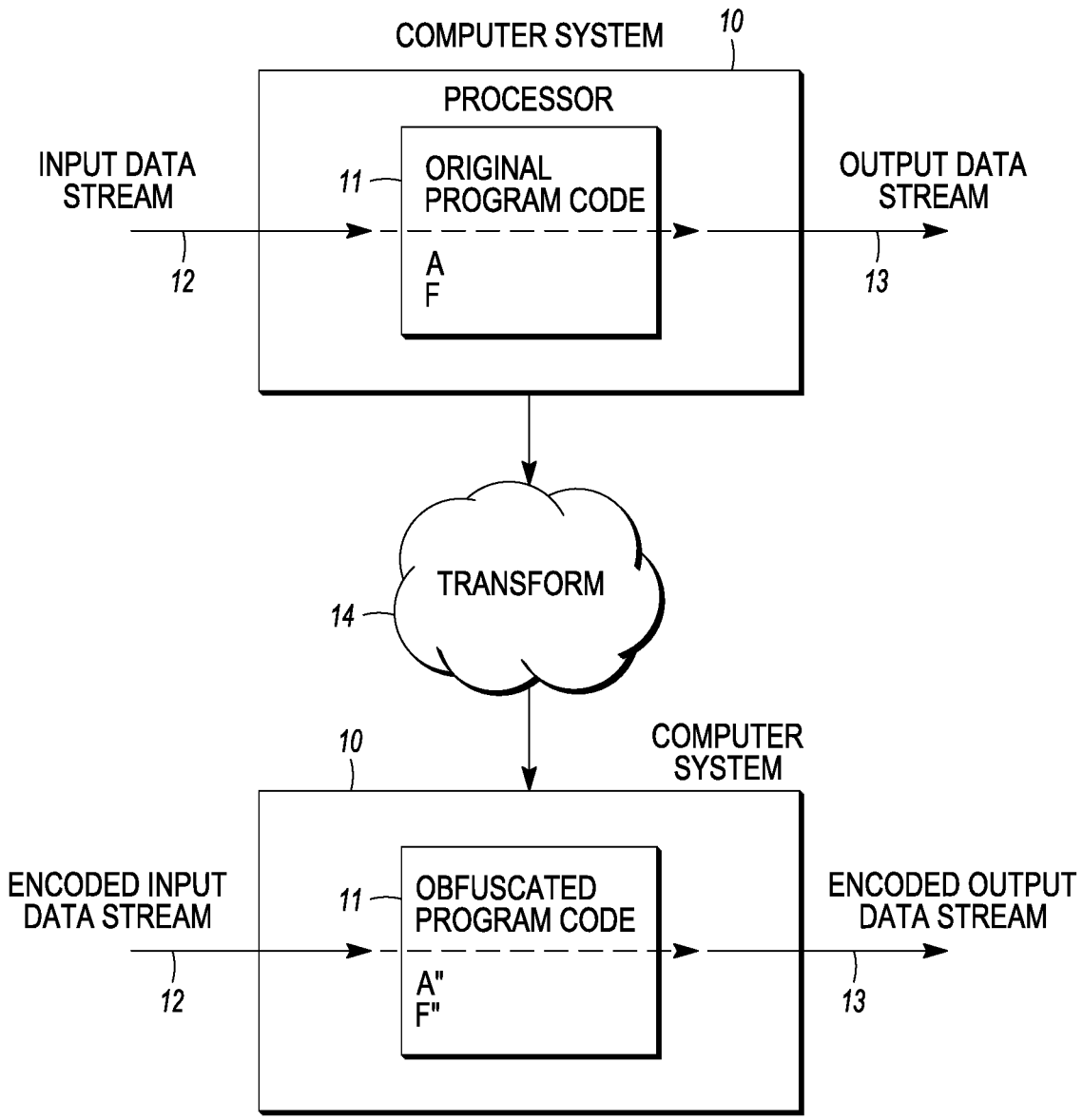
FIG. 1B shows a computer system executing an algorithm for processing a data flow, and a computer system executing a transformed version of the algorithm with the different functionality and has obfuscated code and data flow.

FIGS. 1A and 1B show conceptually what the embodiments described herein provide.

In overview, referring to FIG. 1A, in one embodiment original program code embodying an original algorithm A with original functionality F is transformed into obfuscated program code embodying a different algorithm A' which carries out the same functionality F. The top of FIG. 1a shows the original program code operates on a computer system (such as a data flow receiver like a media player) and its functionality generates an output data stream (data flow) from an input data stream (data flow). The program code is vulnerable to attack. The bottom of FIG. 1A shows obfuscated program code operating on the same computer system with the same functionality. It is less vulnerable to attack, as described above.

More particularly, the top half of FIG. 1A shows a computer system 10 with a processor 11 that executes original program code that embodies the algorithm A. The functionality F of the algorithm A takes an input data stream (input data flow) 12 as an input and generates an output data stream (output data flow) 13. The computer system could be a media player or any other data flow receiver, for example. As an example, the algorithm A could have a decryption functionality that takes an encrypted data stream that embodies content and decrypts it to provide an unencrypted output data stream containing the content in a form that can be displayed to a user. Such a system is vulnerable to attack, as described above. For example, if examined, the original program code that computes the functionality F and/or the internal data flows generated by the program code when it executes can enable reverse engineering of the decryption algorithm/functionality and/or extraction of decrypted data flows so that the content embodied in the input data stream can be accessed and used without authorization.

To address this, a first embodiment of the present invention takes the original program code embodying the algorithm A with functionality F, and using randomized branch encoding, transforms 14 the original program code into obfuscated program code using an obfuscation algorithm. (The obfuscation algorithm and the computer system it is implemented on are described later). The obfuscated program code takes the form of a randomized branch encoded version of the original program code. The obfuscated program code embodies a different algorithm A' but that has the same functionality F as the original algorithm A. When the obfuscated program code is transferred to and executed on the computer system processor (such as in the bottom half of FIG. 1A), it can take the same input data stream 12 and generate the same output data stream 14 as the original program code. If an unauthorized party accesses the obfuscated program code, it is computationally difficult for them to interpret the functionality F of the algorithm A. And, if the internal data flows generated during execution of the obfuscated program are examined, it is computationally difficult to determine what the output data stream will be, and thus the content embodied in the input data stream.

The obfuscated program code above makes it difficult to interpret the functionality and data flows. But, with persistence, it is possible to reverse engineer the program code functionality by using knowledge of the input data flows and output data flows using dynamic analysis. This can be problematic in some applications, such as in protection of streaming media. Even if an adversary cannot determine the decryption and decompression functionality of the obfuscated program code and internal data flows during execution of the program code, the functionality might be determinable/recoverable (with effort) from the input and output data flows, which the adversary also has access to.

To address this, a second embodiment, as shown in FIG. 1B, can implement an additional transform to produce obfuscated program code. The original program code in this embodiment undergoes the same transform as described in relation to FIG. 1B, and also undergoes a further transform to provide a further degree of obfuscation. The second embodiment is transformed to deal with/work with input data flows that are randomly encoded, for example with a random number. Using knowledge of the random number, or other encoding process, the already obfuscated program code is further transformed accordingly so that it can take the encoded input data flow, yet still carry out the required functionality on that encoded input data flow. It then provides output data flow, either unencoded or optionally encoded. If encoded, the program code has an additional transform to provide encoded output. (The obfuscation algorithm and the computer system it is implemented on are described later.) The transform further randomizes the program code, such that the resulting obfuscated program code is yet more difficult to examine. The functionality and algorithm in the obfuscated program code from input to output is different to those of the original program code. As such, the original program code embodying an original algorithm A with original functionality F is transformed into obfuscated program code embodying a different algorithm A" which carries out a different functionality F"'. The obfuscated program code generates (optionally) an encoded output data stream from an encoded input data stream. The encoded output and input data streams, while different from the input and output streams of FIG. 1B, embody the same content (e.g. media content). The output data stream can be decoded (if required) and then used (e.g. displayed to the user) like in the first embodiment. This further embodiment makes it much more difficult to reverse engineer the functionality of the obfuscated program code using dynamic analysis. Due to the randomized encodings on the input flows, the output data flows (whether encoded or not) will appear random with respect to the input data flows even if a dynamic analysis of multiple inputs and outputs is undertaken. This makes it difficult to ascertain the functionality of the obfuscated program code even with dynamic analysis.

The obfuscated program code according to the second embodiment is used in combination with a system that delivers encoded data flows. When transferred and executed on the computer system, the obfuscated program code functionality F"' among other things carries out the additional function of decoding encoded input stream. Even if the adversary can examine the encoded input data flows, and encoded output data flows, they cannot ascertain the functionality of the program code.

2.2 Transforming Original Program Code to Obfuscated Program Code

Figure 2:
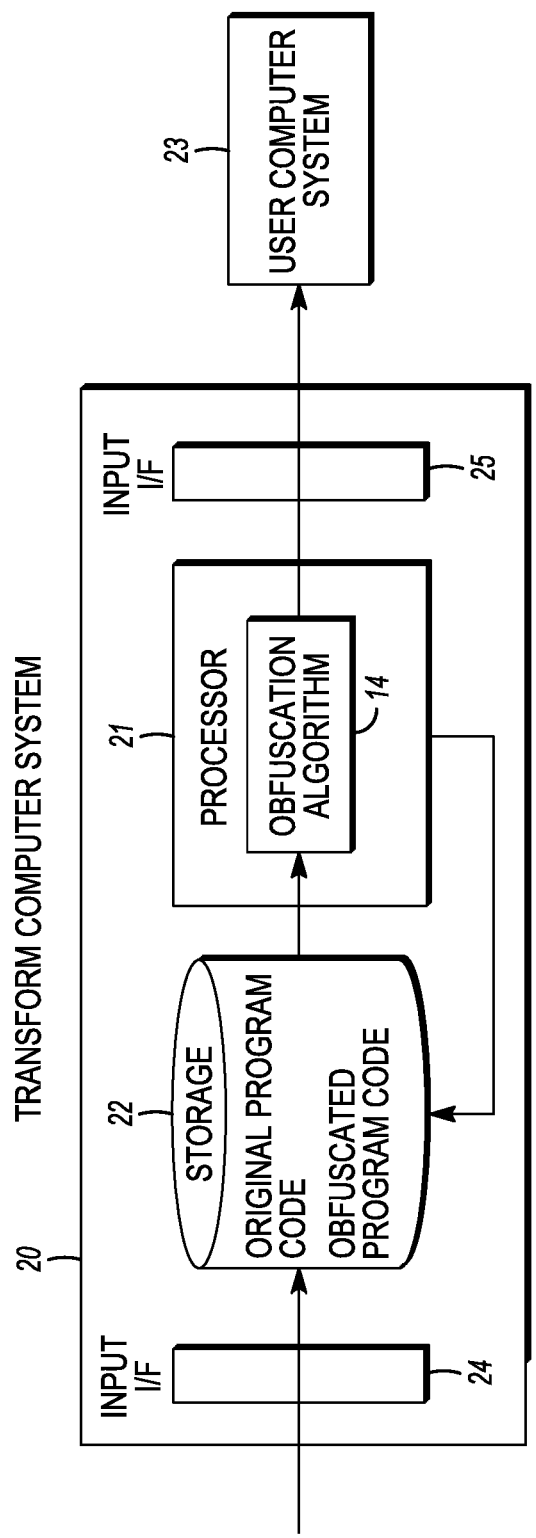
FIG. 2 shows a computer system that is configured to obfuscate an algorithm.
Figure 3:
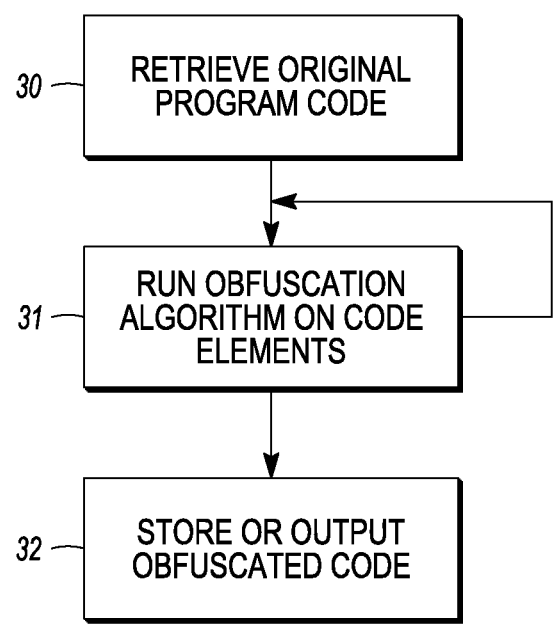
FIG. 3 is a flow diagram showing the steps of code obfuscation.

The process of transforming original program code to obfuscated program code according to the first embodiment will now be described in detail with reference to FIGS. 1A, 2 and 3. Referring to FIGS. 2 and 3, the transform is undertaken on a computer system that has an input 24 and/or storage repository 22 with the original program code to be obfuscated and a processor 21 that executes an obfuscation algorithm that undertakes randomized branch encoding on original program code. The original program code to be obfuscated is taken from the input and/or the storage repository 22, step 30, and passed to the processor 21 that runs the randomized branch encoding obfuscation algorithm (transform) 14. The obfuscation algorithm 14 takes code elements of the original program code and constructs each of them from functional elements represented as (layered) branching programs, randomizes those branching programs, and assembles the functional elements of randomized branching programs for each code element into a randomized branching program that performs the same function as the original program code. That randomized branching program is then converted to program code to form a randomized branch-encoded (obfuscated code) version of the original program code, step 31. The obfuscated program code can then be stored in the repository 22 for later retrieval and use and/or transfer via output interface 25 to another computer system 23 (that is, a data flow receiver such as a media player) for use, step 32. The computer system using the obfuscated code could be the one shown in FIG. 1A, for example. In a preferred embodiment, each code element, once represented as a randomized layered branching program (with input and/or output encodings), is mapped back to an assembler language operation, and is combined with other such mapped operations to form the final obfuscated program code. Alternatively, the branching programs for each code element could be assembled, and then the mapping back to assembler operations could take place at the end.

In the second embodiment, as shown in FIG. 1B, a preferred but optional step is undertaken, where the randomized branching program has a further randomized transform so that it can operate on input data flows with randomized encoding (The randomized branching program comprises randomized input encodings). Input layers of the randomized branching program of each functional element are randomly swapped in accordance with randomized encodings of input data flows. Optionally, output layers of the randomized branching program of each functional element are randomly swapped to also provide encoded output data flows (that is, the randomized branching program comprises randomized output encodings). Therefore, in the second embodiment, the randomized branching program can optionally comprise randomized input and/or output encodings. The randomized input and/or output encodings (to take encoded input data flows and create encoded output data flows) can, for example, be made with a random number that operates on the input data flows. Knowledge of the random number is used to swap layers of the functional element branching program accordingly to allow it to accept and process an input data flow encoded with the random number and provide the correct output data flow. This makes it difficult to reverse-engineer the functionality of the obfuscated program code using dynamic analysis.

In a preferred embodiment, the code elements are assembly language operations of the instruction set provided by the CPU on which the obfuscated program code will be executed on. The original program code can be converted to assembly language operations code elements. The functional elements (from which code elements can be constructed) are IDENTITY, AND, NOT, OR, XOR, ADD, MUL, each of which can each be represented as randomized branching programs (either with or without the additional transform to take input data flow with randomized encodings and optionally output encodings).

Figure 5:
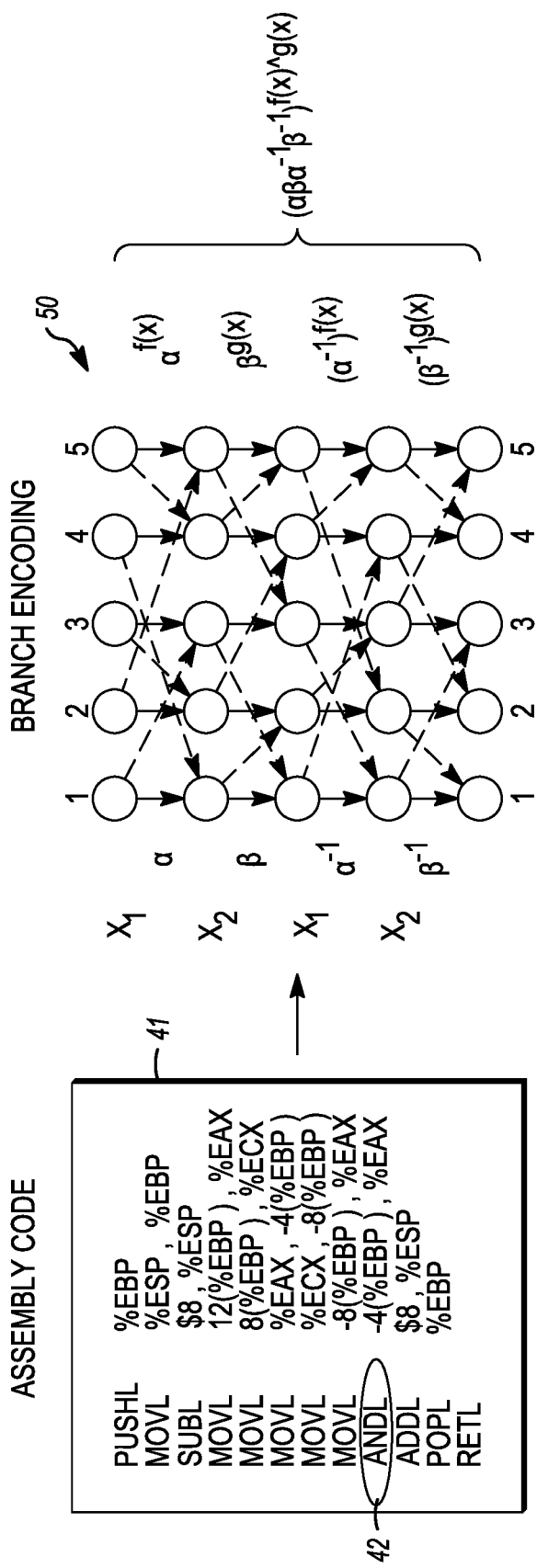
FIG. 5 shows the assembly code being transformed to obfuscated code using branch encoding.

A simplified and illustrative example of how original program code can be transformed into obfuscated program code using branch encoding and randomized input and output encodings (obfuscation algorithm) will now be explained with reference FIGS. 4 to 6. The obfuscation algorithm itself, along with its derivation, will be described later.

Referring to FIG. 4, a high level language, such a C or C++, is used to code/implement the algorithm A to implement desired functionality F. This results in original program code, such as the high level code 40 shown in FIG. 4, which requires obfuscation. It is worth noting, that more generally, there will be many algorithms embodied in original program code, implementing many different functionalities. Reference to a single algorithm and functionality is by way of example for clarity, and should not be deemed limiting. The high level language program code is then compiled into assembly program code 41, or other suitable low level language/code. This comprises code elements being assembly language operations taken from the instruction set of the CPU on which the program code is executed (see, for example, the AND operation 42). The low level code embodies (that is, the code elements together carry out) the same algorithm A and functionality F of the original program code. The low level code can also be termed the "original program code", and requires obfuscation. That is, the high-level language code or its equivalent low-level language code is original program code. This code can be stored in a repository 22.

The original program code is then passed to the obfuscation algorithm 14 on the processor 21 of a computer system 20 that performs the transform. (Alternatively, the conversion from high-level language code to low-level language code could be considered an optional part of the transform). The obfuscation algorithm takes the (low-level language) original program code 41 as input, and on each code element (e.g. AND element 42), implements randomized branch encoding (either with or without the additional transform to take input data flow with randomized encodings) as described herein to represent each code element as a randomized layered branching program to produce a randomized branch encoded version of the code element. Each branching program is then mapped back to an assembler language operation. Alternatively, the randomized branching programs for each code element are first assembled to produce a randomized layered branching program representation of the entire code, then that is mapped back to corresponding assembler language operations. Reference to randomized branch encoded version of the code element/ overall program can refer to its layered branching program representation, or the eventually converted/mapped low-level or subsequent high-level code definition of the randomized layered branching program representation.

Briefly, the obfuscation algorithm will be described here, and explained more fully below. The obfuscation algorithm is based on a development of Barrington's Theorem, which states that any arithmetic or logical operation can be represented by what is called a constant width branching program; which is a mathematical structure composed of a sequence of permutations. Referring to FIGS. 5 and 6, the first step of the obfuscation algorithm comprises identifying the arithmetic and logical operations (e.g. code elements) in the original program code. As an example, in FIG. 5, the AND code element is identified. For each code element (such as the AND operation), the obfuscation algorithm generates a randomized branching program 50 to carry out the same operation using a functional element, each functional element being formed as a branching program (see, e.g., the AND branching program 50). FIG. 5 shows the diagrammatic representation 50 of the layered branching program. It will be appreciated by those skilled in the art that this diagram is not actually what the algorithm generates—rather it generates a layered branching program with the function indicated by the diagrammatic representation 50.

Then, permutations of the branching program for each functional element are swapped in a random manner to create a randomized branching program for the functional element. Also, optionally, where randomized input encodings are used on the input data flows, layers of the randomized branching program are modified accordingly to expect/ operate on modified inputs, using knowledge of the encoding process on the input data stream (e.g. random number encoding). Optionally, where randomized output encodings are required on the output data flows, layers of the randomized branching program are modified accordingly to provide modified outputs using the output encoding. The randomized branching program's permutations for each code element are then combined to form a randomized branching program defining a functionality to replace that of the original program code overall. The addition of randomized input encodings makes it much more difficult to reverse engineer the functionality of the eventual obfuscated program code using dynamic analysis. Due to the randomized encodings on the input flows, the output data flows (whether encoded or not) will appear to vary arbitrarily even if a dynamic analysis of multiple inputs and outputs is undertaken. This makes it very difficult to ascertain the functionality of the obfuscated program code even using dynamic analysis.

Figure 6:
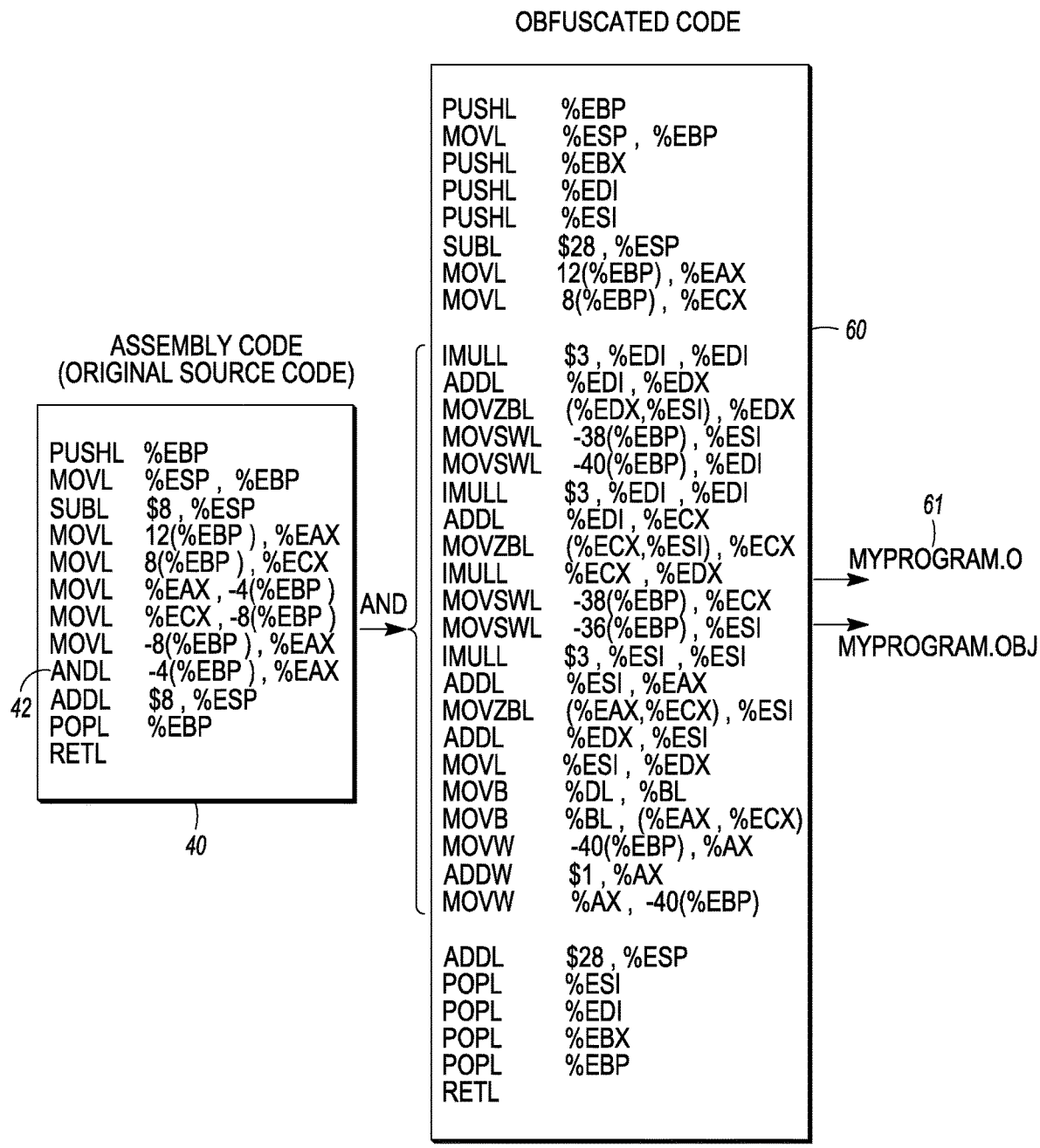
FIG. 6 shows the original source (assembly) code transformed into the obfuscated code.

Referring to FIG. 6, the next step is to convert the generated randomized branching program for each code element back to assembly language operations and combine these to form program code (obfuscated program code 60), so as to concretely implement the desired level of complexity and unintelligibility in the code itself. In this case, the AND element has been represented as obfuscated code. (At this point, the other code elements have not yet been transformed/obfuscated, so turn up in the obfuscated code in more or less the original code form. As such, by way of illustrative example, FIG. 6 only shows partially obfuscated code to demonstrate the concept. But, as will be appreciated, the transform can proceed on the other code elements also, so eventually all or most of the code will be obfuscated. This also highlights that it is not necessary for all code elements to be obfuscated, and obfuscating just some will still result in partially obfuscated code, which may still be obfuscated sufficiently to provide advantages. This will be explained below further in relation to the pseudo code, where, for example, some particular code elements are deliberately not obfuscated).

Preferably, the branching program is "converted" into an obfuscated form using matrix operations. This is because, in practice, generating layered branching programs for each code element is inefficient. So, the equivalent functional output is generated using more efficient matrix calculations, which can be defined as assembly code, and which performs the same functionality as the layered branching program (and therefore original code element). The assembly code to carry out the matrix calculations forms the output obfuscated code. As such, the matrix operations generate the obfuscated code. In the case of the AND example in FIGS. 5 to 6, a matrix is constructed to compute the AND operation as a Ben-Or and Cleve group program (which corresponds to the branching program in FIG. 5). This is done as follows.

We wish to construct ab Ben-Or and Cleve group program to compute the AND operation. Let $\mathbb{F}_s = \{-1, 0, 1\}$ then let $$I = \begin{bmatrix} 1 & 0 & 0 \\ 0 & 1 & 0 \\ 0 & 0 & 1 \end{bmatrix}$$

be the identity element in $SL_3(\mathbb{F}_3)$.

1. choose two matrices $$A, B \xleftarrow{U} SL_3(\mathbb{F}_3)$$

at random where U denotes the uniform distribution over all elements in $SL_3(\mathbb{F}_3)$. For example:

$$A = \begin{bmatrix} 1 & 0 & 0 \\ 0 & 0 & 1 \\ 0 & -1 & 0 \end{bmatrix}$$

$$B = \begin{bmatrix} 0 & 0 & 1 \\ 0 & 1 & 0 \\ -1 & 0 & 0 \end{bmatrix}$$

2. Compute the inverses C and D of A and B, respectively.

$$C = A^{-1} = \begin{bmatrix} 1 & 0 & 0 \\ 0 & 0 & -1 \\ 0 & 1 & 0 \end{bmatrix}$$

$$D = B^{-1} = \begin{bmatrix} 0 & 0 & -1 \\ 0 & 1 & 0 \\ 1 & 0 & 0 \end{bmatrix}$$

3. For all input $x_1, x_2 \in \{0, 1\}$, our AND group program performs the following computations:

| $x_1$ | $x_2$ | $x_1 \wedge x_2$ | $(ABA^{-1}B^{-1})^{f(x) \wedge g(x)}$ | |
|---|---|---|---|---|
| 0 | 0 | 0 | $I \cdot I \cdot I \cdot I$ | $\begin{bmatrix} 1 & 0 & 0 \\ 0 & 1 & 0 \\ 0 & 0 & 1 \end{bmatrix}$ |
| 0 | 1 | 0 | $I \cdot B \cdot I \cdot B^{-1}$ | $\begin{bmatrix} 1 & 0 & 0 \\ 0 & 1 & 0 \\ 0 & 0 & 1 \end{bmatrix}$ |
| 1 | 0 | 0 | $A \cdot I \cdot A^{-1} \cdot I$ | $\begin{bmatrix} 1 & 0 & 0 \\ 0 & 1 & 0 \\ 0 & 0 & 1 \end{bmatrix}$ |
| 1 | 1 | 1 | $A \cdot B \cdot A^{-1} \cdot B^{-1}$ | $\begin{bmatrix} 0 & 1 & 0 \\ 0 & 0 & 1 \\ 1 & 0 & 0 \end{bmatrix}$ |

The computations above can be carried out in assembly code to calculate the matrix operations and thereby calculate the group program that implements the AND operation. That assembly code results in obfuscated program code 60, as shown if FIG. 6, that replaces the original AND operation with unintelligible yet equivalent code that carries out the same function. That is, the matrix calculations for the AND code element are transformed into the obfuscated code for the AND code element. As noted above, the other code which remains unobfuscated in FIG. 6 could be obfuscated in the same manner.

If it has randomized input and/or outputs according to the second embodiment, the functionality is different to the original program code as it is now designed to receive input data flows with encodings. If only obfuscated according to the first embodiment, the obfuscated code is designed to take unencoded input, which performs the same function as the original program code but is unintelligible. The obfuscated program code is a randomized branch encoded version of the original program code. The obfuscation algorithm outputs the randomized branch encoded version of the original program code (which has the additional transform to optionally take input data flow with randomized encodings, and also optionally to take output randomized encodings on the output data flows). This is the obfuscated program code. The above describes generating obfuscated program code using randomized branch encoding according to the second and preferred embodiment. In an alternative, according to a first embodiment, it is possible to generate obfuscated program code which is constructed from randomized branch encoding, but has not had the additional transform to process input data streams with randomized input encodings.

The obfuscated assembly code is then assembled into high-level object code 61 using a standard assembler in the same tool chain so that it can be linked into the application. The resulting assembly code and high-level object code is obfuscated program code also. This can then be transferred to the repository 22 on the computer system 20 to the storage for later use, or transferred via the output interface 25 to another computer system 23 for use. Optionally, the original program code could be compiled and obfuscated directly to object code without the need for an intervening assembly step.

The end result is that obfuscation is transparent, as the substituted code is designed to perform exactly the same function (in the case of the first embodiment) as the original code as well as preserving its functionality. But, as can be seen, the branching program code is far more complex than the original program code. The complexity and the randomness of these branching programs is designed to make the obfuscated program unintelligible and thus difficult for an attacker to analyze and to attack. This can be taken further to produce an indistinguishability obfuscator which makes attacks computationally infeasible, which is the much stronger security notion that applies to cryptographic systems.

The obfuscated program code can be generated and transferred at the time of manufacture of the particular software and/or hardware device it will be used in. For example, in the case of a media player, obfuscated program code carrying out the decryption functionality from the media player can be generated and transferred to a processor on the media player as it is being manufactured. Alternatively the obfuscated program code can be transferred at a later time, such as via download through a telecommunications channel. This would enable update of the obfuscation program code at regular intervals, either to take into account change in functionality, or to provide an additional layer of protection by routinely changing the obfuscated program code. It will be appreciated that these are just some examples, and the obfuscated program code generated using the first or second embodiments of this invention could be used in any application, and transferred to the software and/or hardware of that application in any suitable manner.

2.3 Obfuscation Algorithm

The obfuscation algorithm of step 31 and its derivation will now be described in detail with reference to the derivation under heading 4 of this specification, and also the simplified but illustrative example with reference to FIGS. 4 to 6.

Referring to Heading 4.5 of the derivation, the derivation demonstrates how a common subset of assembly language operations can be represented as randomized layered branching programs of corresponding functionality IDENTITY, AND, NOT, OR, XOR, ADD, MUL (and by induction INC, DEC, SUB), or some derivation of those functional elements (those skilled in the art will know that functional elements may be derived as combinations of other logical functional elements). The assembly language operations can map to specific operations in the respective instruction sets of typical CPUs, such as x86, ARM, MIPS. This common subset of assembly language operations are the code elements making up the original program code. The description column shows the functional elements (with corresponding randomized branching program representations) that can be used to create a randomized branch encoded version of each code element in the table. The derivation for each of these will now be briefly described.

Figure 14:
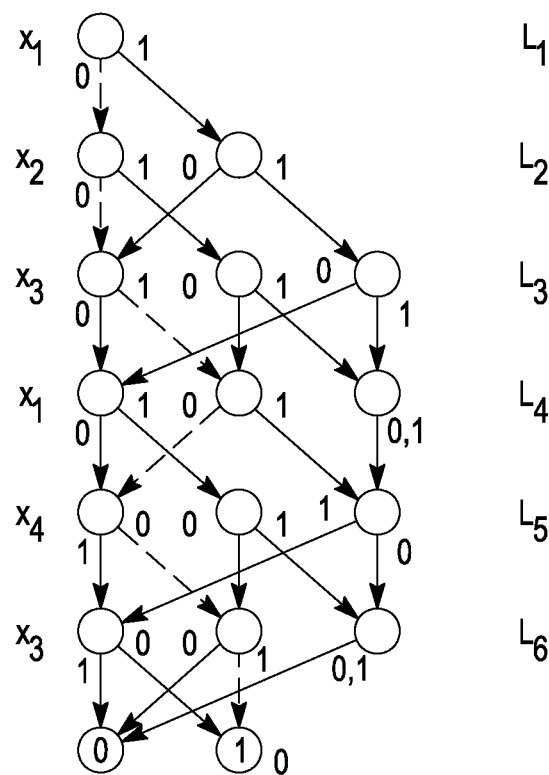
FIG. 14 shows a layered directed acyclical graph of a branching program.
Figure 15:
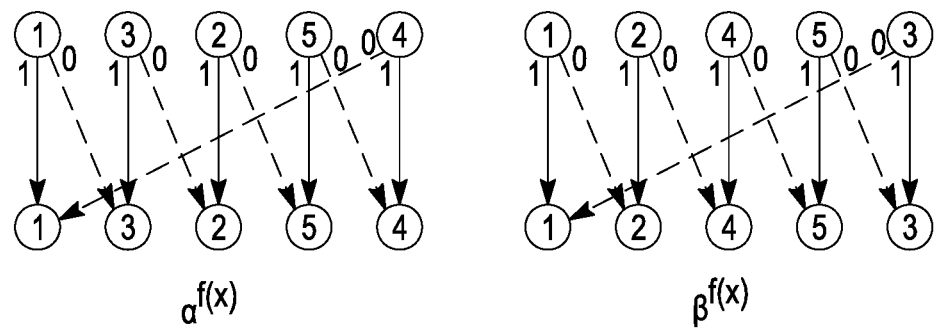
FIG. 15 shows a representation of a group program as a layered branching program computing function f(x).
Figure 16:
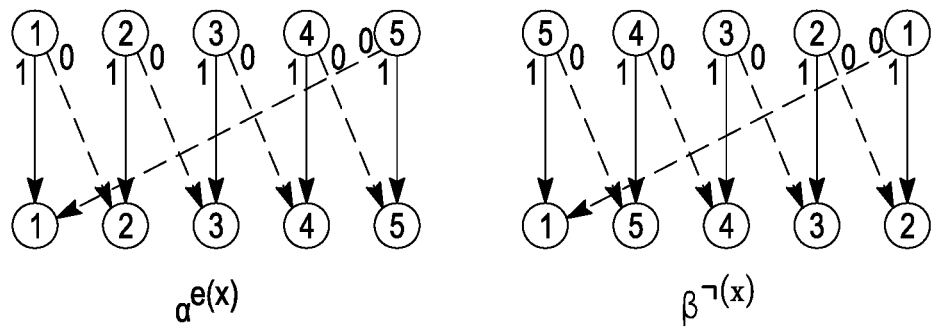
FIG. 16 shows a representation of a group program as a layered branching program for the IDENTITY function and the NOT function respectively.
Figure 17:
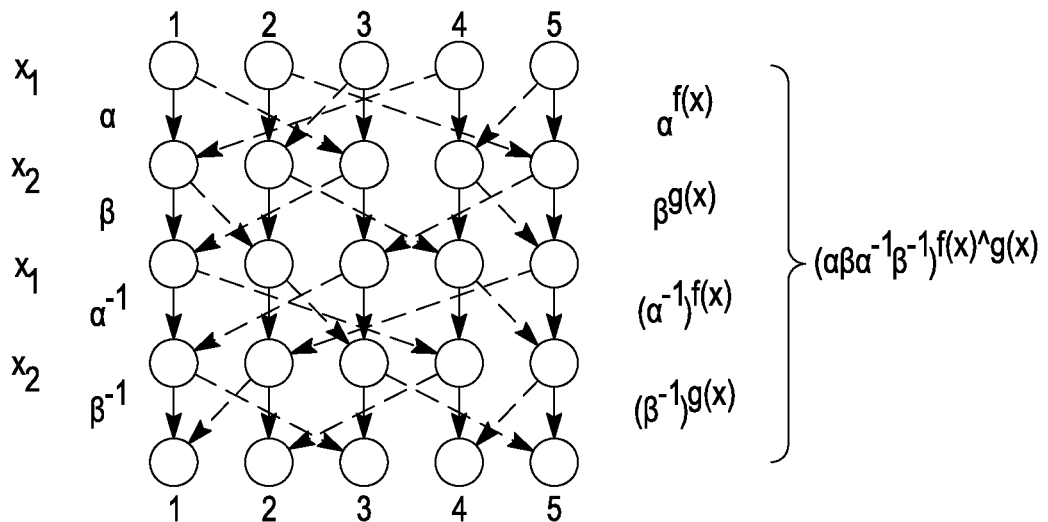
FIG. 17 shows a representation of a group program as a layered branching program for the AND function.

Referring to Heading 4.2 of the derivation, a layered directed acyclic graph (DAG) can represent (emulate) a function (e.g. arithmetic or logical operation) using interconnected nodes. A function can be evaluated by starting at the top node and following the interconnections corresponding to each (single bit) input, as shown in FIG. 14 of the derivation. A layered directed acyclical graph can be used to represent a branching program. A layered directed acyclic graph can be used to represent a group program as a layered branching program in terms of Barrington's theorem. For example, the IDENTITY function and the NOT function, can be represented in this way, such as shown in FIG. 15 of the derivation. More complex functions, such as the AND function, can be constructed from the identity and NOT function, such as in FIG. 17. Barrington's theorem further demonstrates that a group program can constructed as a layered branching program using a combination of concatenated identity and NOT functions, or higher-level functions such as the AND, OR functions. These are called "functional elements" that are each themselves represented as a branching program.

A group program could represent a logic circuit or a single gate in a logic circuit; or equivalently a group program could represent a computer program that carries out a desired function, or a single code element of a computer program. Therefore, using Barrington's theorem, a computer program can theoretically be represented as a branching program, where the computer program code is constructed from functional elements that can also be represented as branching programs.

Figure 18:
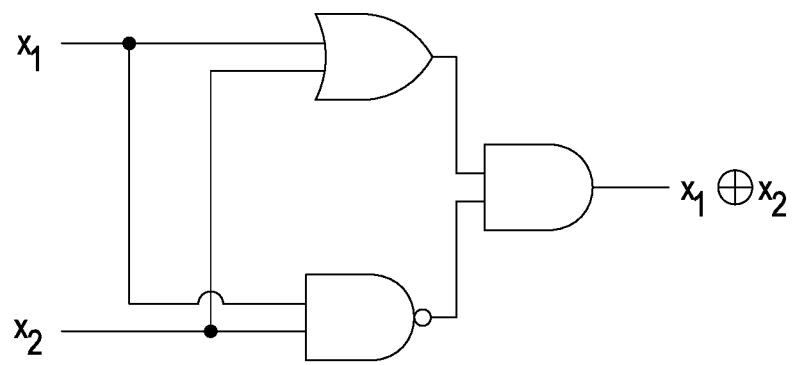
FIG. 18 is an exclusive-OR function.

While these functions (e.g. IDENTITY, AND, NOT, OR functions) in theory can be combined to represent any group program (that is, any computer program function, such as a code element), it is computationally inefficient to do this for more complex code element functions. A computer program function represented using branch encoding using a combination of branching programs of functional elements for each code element in the computer program would be too large and complex to implement. Therefore, the present inventor determined that further functional elements represented as more efficient branching programs are required to construct more complex code elements. A variation of Barrington's theorem can utilize special linear groups to construct an efficient group program to compute the binary XOR (exclusive OR) function. A group program (e.g. code elements of a computer program) can be constructed as a layered branching program using a combination of XOR functions, see FIG. 18, implemented in matrix calculations. This results in a more efficient group program, which can take single bits as input and output single bits.

Referring to Heading 4.3 of the derivation, a further improvement is described where are a group program can be constructed as above for a more complex code element that can take multiple bit inputs (word inputs), and can compute arithmetic functions with word sizes that are compatible with typical CPU architectures. This results in ADD, MUL, INC, DEC and SUB functional elements that are represented as layered branching programs. This enables more complex individual code elements of program code (e.g. an ADD operation) to be represented as functional element branching programs.

Using the branching program representations of the functional elements above, a construction can therefore represent any computer program code as a layered branching program and can emulate the same function. The layered randomized branching program can be converted back to computer program code, representing a branch encoded version of the original computer program code that carries out the same function. Constructing a layered branching program to represent a computer program, and/or the resulting computer program code, is called branch encoding.

Referring to heading 4.4 of the derivation, the permutations of a layered branching program can be changed in a randomized way—that is, the paths between nodes can be randomly changed. This is called randomized branch encoding. The randomized branch encoding still retains the same functionality. The resulting randomized layered branch encoding (and resulting program code) is unintelligible. It is computationally difficult to examine the program code and determine the functionality of the code. The first embodiment as described here in results in randomized branch encoding of original program code with a function, resulting in unintelligible (obfuscated) program code that carries out the same function as the original program code.

Referring to definition 4, where the input data flows have randomized encodings, the randomized branching program above can be further transformed to receive data flows with input encodings. Knowledge of the process (such as a random number) used to encode the input data flows is used to modify layers in a group program accordingly to expect/operate on modified inputs. For example, if a bit of an encoded input data flow is flipped from the unencoded input data flow (e.g. a "1" goes to a "0"), then the input layer of the branching program for that bit is modified accordingly to provide the same output for a "0" input as previously it provided for a "1" input. Optionally, a randomized output encoding is obtained by multiplying each element with a random permutation. The resultant group program (and program code) cannot easily be analyzed.

Heading 4.5 shows the application of the above derivation to construct one possible embodiment of an obfuscation algorithm. Using randomized branch encoding, the common assembly language operations (code elements of original program code such as shown in Table 2) can be constructed as randomized branching programs from IDENTITY, AND, NOT, OR, XOR, ADD, MUL functional elements (themselves implemented with branch encoding). Each code element can be constructed as summarised under heading 4.5, and as described through the derivation. These are combined resulting in a group program that when converted back to program code results in obfuscated program code executing algorithm A" with functionality F". The encoded output flows can then be decoded using the random number to get the required output flows for use.

It will be appreciated that the layered branching programs to perform the function of code elements are shown in FIGS. 15 to 18 in a diagrammatic representation. This diagrammatic representation not what the algorithm actually generates, it just represents what the transformation algorithm generates. The transform utilises matrix calculations (as shown under heading 4) to generate the layered branching programs, which leads to the eventual obfuscated code (the eventual code being the assembly language instructions to carry out the layered branching program that represents the original code element).

Figure 13:
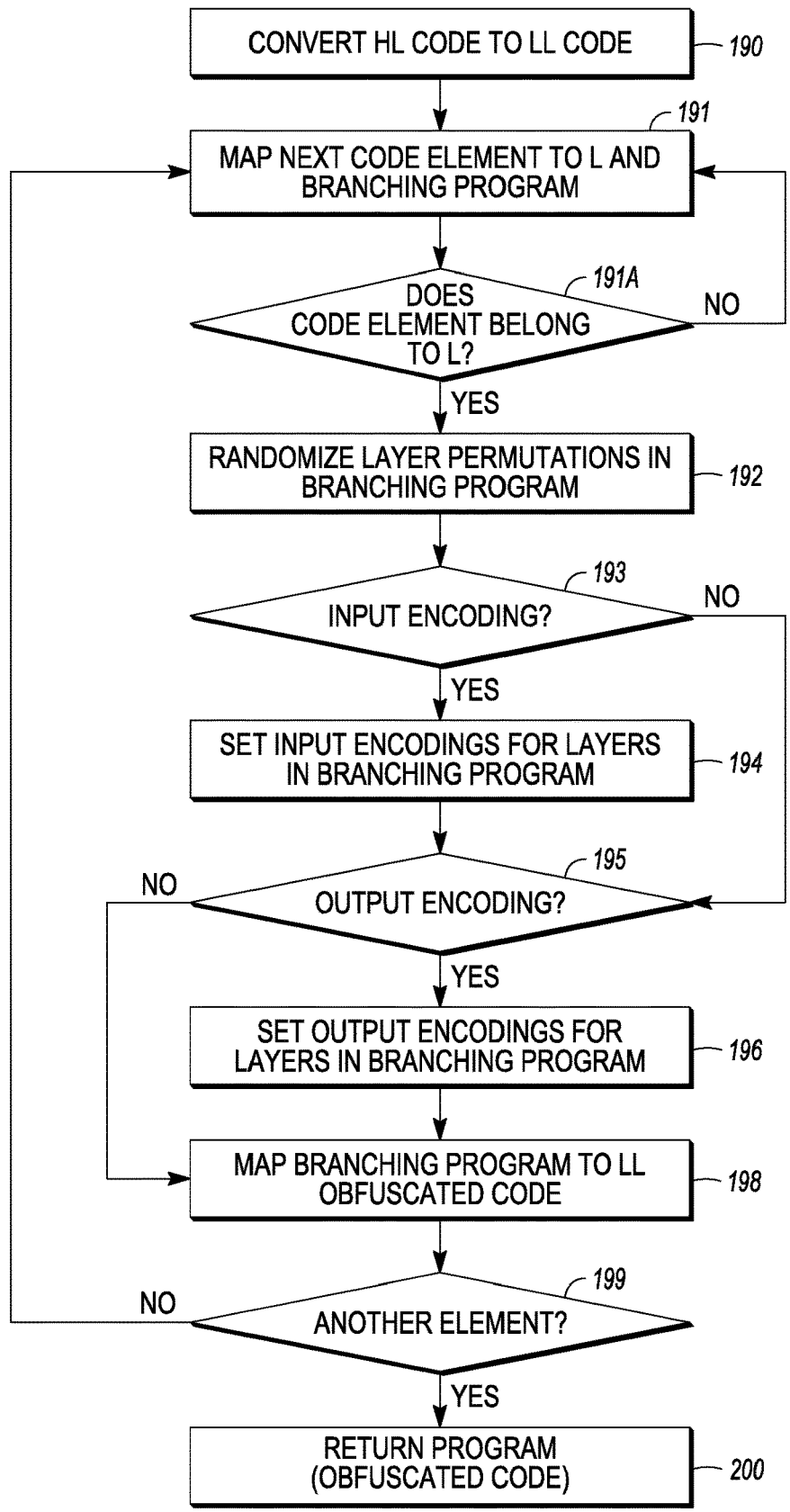
FIG. 13 shows a flow diagram of the transform method according to one embodiment.

The obfuscation algorithm of step 31 based on the above derivation is replicated and explained here. The pseudo code is set out below. The obfuscation algorithm implements a randomized branch encoding method (including using input and output encodings) to transform the original program code into obfuscated program code. FIG. 13 shows the flow chart of the algorithm. The algorithm will be explained with reference to FIGS. 4 to 6 and the AND code element as an example, although it will be appreciated the other code elements can be processed by the algorithm in the same manner. The algorithm is just one possible algorithm implementation of the transform, and those skilled in the art will appreciate that the transform could be made with alternative algorithms that still carry out the same conceptual transforms.

---

Algorithm 1 Randomized branch-encoder algorithm.

---

Require: P, L, Γ, G, u
Ensure: $\forall i \in [L, d] : (\exists f_i \in P) \wedge (\exists f_i' \in P') : \forall x, u : r_{i,j}(f_i(x)) = f_i'(x \oplus u, r_i)$
1:   for each $f_i \in P$ do
2:     if $f_i \in \Gamma^L$ then
3:       $g_i \leftarrow \Gamma^L(f_i)$       Map $f_i$ from L to group program $g_i \in \Gamma^L$
4:       $l_i = [g_i]$       Establish the length of the group program $g_i$
5:       $r_i = (r_{i,1}, \ldots, r_{i,\ell_i}) \xleftarrow{U} G^{\ell_i}$     Randomly choose $\ell_i$ permutations
6:       for each $j \in [L, l_i]$ do
7:         if input encodings required then
8:           $g'_{i,j} \leftarrow g_{i,j}^{u_{k_j} \oplus x_{k_j}}$     Set input encoding (for $g_{i,j}^0$ and $g_{i,j}^1$)
9:         else
10:          $g'_{i,j} \leftarrow g_{i,j}^{u_{k_j}}$
11:         end if
12:         if $j < l_i$ or output encodings required then
13:           $g_{i,j}' \leftarrow g_{i,j}' \cdot r_{i,j}$       Multiply by $r_{i,j}$
14:         end if
15:       end for
16:       $f_s' \leftarrow (L^\Gamma(g_{i,1}'), \ldots, L^\Gamma(g_{i,J_i}'))$   Map $g_i'$ back to language L
17:     else
18:       $l_i = 1$
19:       $f_i' \leftarrow f_i$       Instructions not in $\Gamma^L$ are simply copied
20:     end if
21:   end for
22:   return $P' = \{f_1', \ldots, f_d'\}$

---

The algorithm operates on a program P comprising code elements/assembler code operations Γ, mapped from assembler code operations and language L using permutations G. For all functions there exists an obfuscated instruction.

The transform method functions as follows, with reference to FIG. 13. This assumes that the original high level code (numeral 40, FIG. 4) has been converted to low level code (numeral 41, FIG. 4), step 190.

Lines 1, 2, 3: Step 191—for each code element in program P for language L, if there is an equivalent code element in the equivalent common subset assembly language code element, then map the code element to the group program (that is, define the code element as a corresponding functional element represented as layered branching program) for that code element. For example, the code element AND (numeral 42 in FIG. 5) is represented as the layered branching program representation of AND (represented diagrammatically as 50 in FIG. 5).

Lines 4, 5: Step 192—establish the group program length of the branching program for the code element, and randomly choose the layer permutations. That is, randomly choose the paths for the 1 and 0 inputs between the nodes of one layer of the branching program to the nodes of the subsequent layer in the branching program. This randomizes the branching program.

Lines 7, 8: Step 193, 194—optionally, if performing the further transform to accept input data flows with randomised encodings, then carry out lines 7, 8. Set the input encodings for the layered branching program representing the code element. For example, if the encoding process for the input data flow is to exclusive-OR each data flow bit with a random number, then modify the input layers of the branching program to expect/work with modified input in accordance with the same exclusive OR (XOR) with the same random number. The input encodings are set in accordance with the output encodings of the previous code element represented as a branching program, or to take the encoded input data flow, as appropriate.

Lines 9, 10, 11: Step 193—If the input data stream is not encoded then, no input encodings are created.

Lines 12, 13, 14: Step 195, 196—optionally, if performing the further transform to output data flows with randomised encodings, then carry out lines 11, 12. Set the output encodings for the layered branching program representing the code element. For example, if the encoding process for the output data flow is to exclusive-OR each data flow bit with a random number, then modify the output layers of the branching program to provide output according to the same exclusive-OR with the same random number.

Lines 6, 15: Step 197—repeat the above steps for each layer in the branching program.

Line 16, 17, 18 19, 20, 21: Step 198—the code element represented as randomized branching program is transformed/mapped back to the corresponding assembler language operations for language L—this is the obfuscated code representation of the code element of the original source code. Where matrix calculations are used to implement the branching program for the code element, the assembly language operations for the matrix calculations are the obfuscated code for the original code element. If more code elements exist in the source code, step 199, then the next code element from the source code is then mapped, step 191. This is repeated for all other code elements in the source code. If the original code element does not map to an equivalent code element in Language L, the code element is simply mapped back to the same code element, step 191A. That is, the language element is simply copied and a randomised branch encoded version of it is not constructed.

Line 22: Step 200—return the program P', which is the obfuscated program code of the original program code for all code elements in the original source code.

The above describes generating obfuscated program code using randomized branch encoding which has the additional (optional) transform to take input data flow with randomized encodings, and optionally output randomized encodings on the output data flows. That is, randomized input and output encodings according to the second and preferred embodiment. In an alternative to the second embodiment, it is possible to generate obfuscated program code which is constructed from randomized branch encoding, but does not have randomized output encodings. In yet a further alternative according to the first embodiment, there are no randomized input or output encodings at all. The additional transform to take input data flow with randomized encodings, and optionally output randomized encodings on the output data flow is not made. In this instance, optional lines 9 to 14 are omitted from the obfuscation algorithm.

3. Utilization of Obfuscated Code

Figure 7:
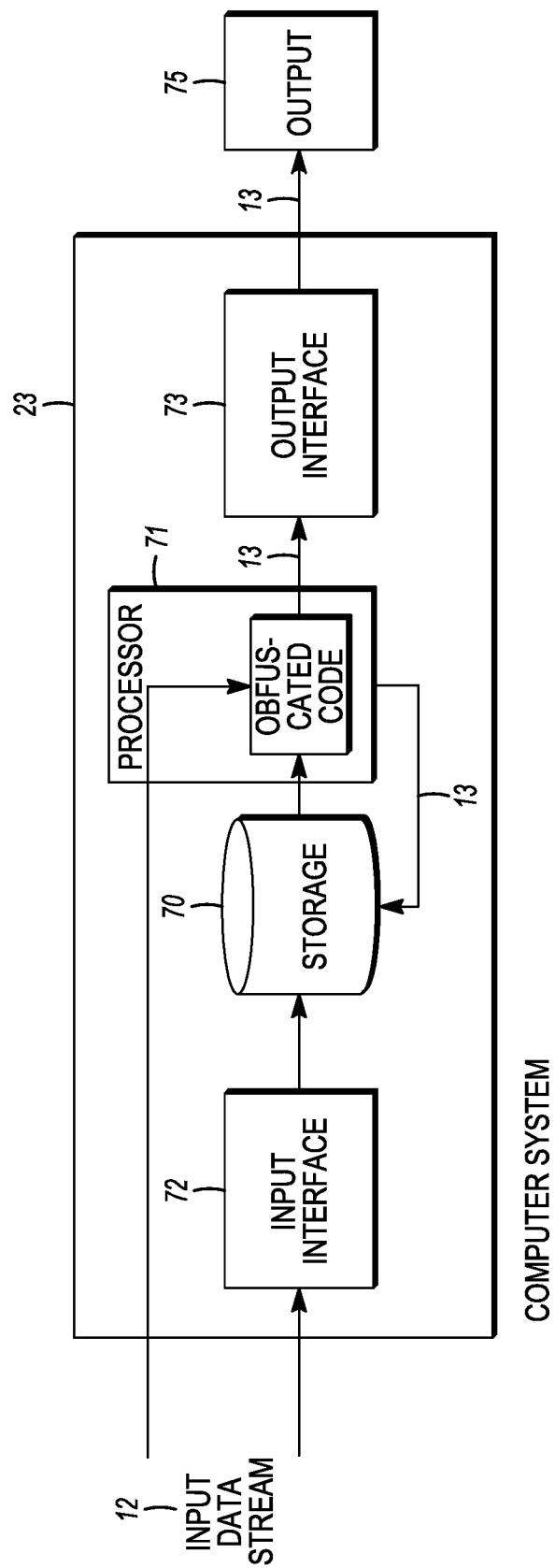
FIG. 7 shows a system that processes input data streams and generates output data streams using an obfuscated algorithm and data flow.

Once created, the obfuscated program code (either of the first embodiment or the second embodiment) can be transferred to a computer system (data flow receiver) 23 for data flow processing, such as that shown in FIG. 2. The computer system 23 executes the obfuscated program code such that the functionality of the embodied algorithm processes the input data flows and generates output data flows, as previously described broadly with reference to FIG. 1. Such a computer system 23 is shown generally in FIG. 7, and could also be the same computer system 10 referred to in FIGS. 1A, 1B.

The data flow receiver computer system 23 comprises a storage repository 70, a processor 71 that executes the obfuscated program code, an input interface 72 and an output interface 73. The obfuscated program code that has been previously generated is transferred to the computer system 23, either directly into the processor 71—e.g. at the time of manufacture, or into the storage 70 where it is later retrieved by the processor 71 when the code has to be executed. Input data streams 12 for processing by the obfuscated program code are received via the input interface 72 and optionally stored in the storage repository 70. Upon execution of the obfuscated program code, the input data stream 12 is received directly at the processor 71 or retrieved from the storage repository 70. The obfuscated program code executes a functionality that processes the input data stream and generates an output data stream which can then be used in further processes executed by the processor 71, or can be output via the output interface 73 to another system 75 (such as an audiovisual system).

As an example, the input data stream 12 could be an encrypted data stream embodying content which is decrypted by the obfuscated program code and the unencrypted data is then output for use. The obfuscated program code and the data flows within it during execution cannot easily be interpreted and the content not accessed, even if they can be accessed. The obfuscated program code carries out a functionality that is the same as the functionality embodied in the original program code. Therefore, the output data flow generator from an input data flow is exactly the same as if the original program code were used in the computer system.

As another example, randomized input encodings are used on the encrypted input data stream, and the obfuscated program code takes the encoded input data stream, carries out the decryption process, and outputs either unencrypted but encoded data output flows, or unencrypted and unencoded output data flows, depending on the preferred option.

3.1 Streaming Media Delivery System

Referring to FIGS. 8 to 12, in one possible example, obfuscated program code generated as described above could be used in place of original program code that provides decryption, decompression and/or decoding functionality used in media streaming delivery systems.

Figure 8:
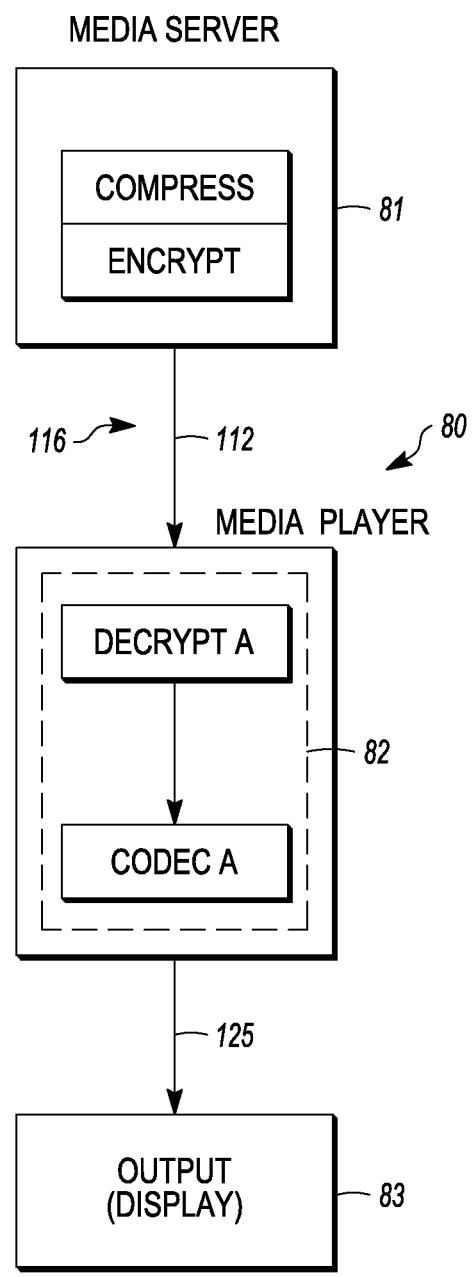
FIG. 8 shows a prior art streaming media delivery system.

FIG. 8 shows a typical media streaming delivery system 80, comprising a media server 81, a media player 82 and an output 83, such as an audiovisual system (display). The media server 81 is shown generally in FIG. 11. The media server comprises a storage repository 110 with media content 114, a processor 111, which takes the media content and executes algorithms 117 to generate a media stream 112 (becoming input data stream 13) embodying the media content 114 in an encrypted and compressed form, and a server (such as a web server, broadcasting transmitter or the like) for transmitting the stream over a suitable transmission channel 116, such as an internet channel, telecommunications channel or a television broadcast transmission. The encrypted media stream is received at a media player at the end user/subscriber's location.

Figure 12:
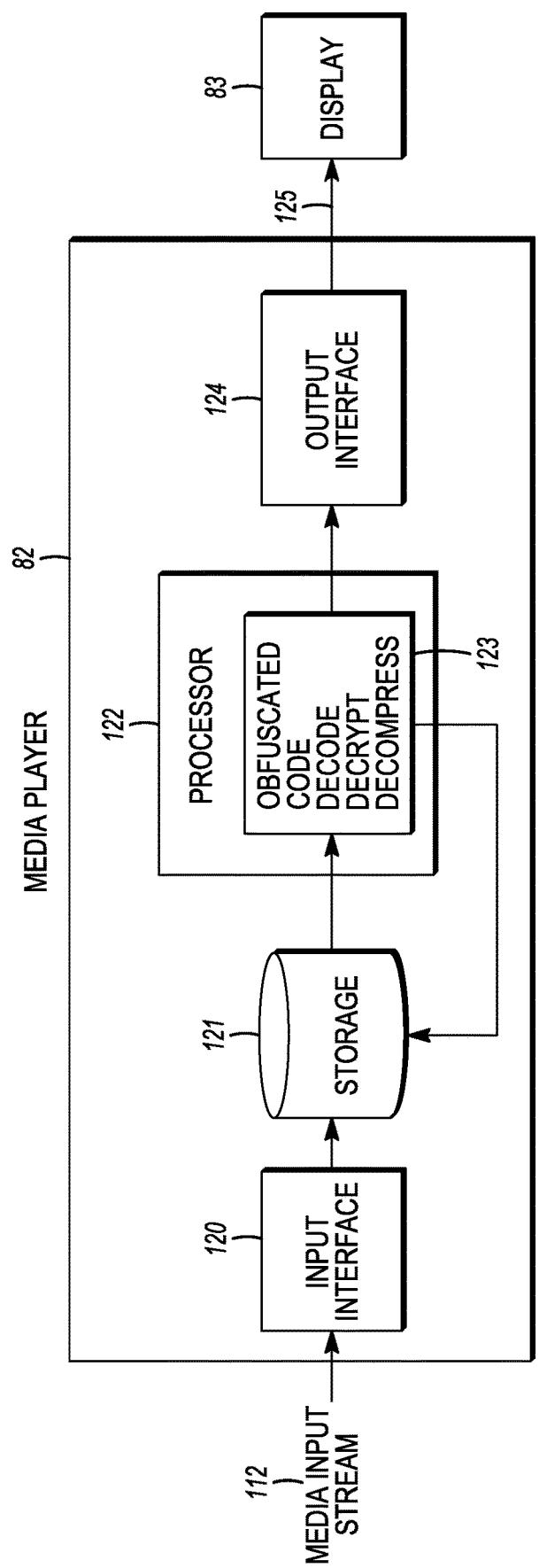
FIG. 12 shows a media player of the streaming media system in more detail.

Referring to FIG. 12, the media player 82 is the data flow receiver hardware that comprises an input interface 120, data storage repository 121, processor 122 running a decryption and codec algorithm 123 and an output interface 124. The media player 82 is one example of a data flow receiver computer system 23 such as that more generally described in FIG. 7. The processor 122 receives the input media stream 112 either directly or from the data storage repository 121 and executes the algorithms 123 to decrypt and decompress the media stream 112. This results in an output media stream with the media content 125 that is then passed through the output interface 124 to the output device, which might be an audiovisual system 83 such as a television. The output device optionally might be integral with the media player 82. The output device 83 can take the unencrypted media stream and use it to display the media content to the user/subscriber.

If an unauthorized party intercepts the media stream in the transmission channel 116, they cannot easily retrieve the media content 114 and us it unless they know the decryption algorithm. However, if an unauthorized user taps into the media player 82, they may be able to determine the media content 114 from reverse engineering the decryption/codec algorithms 123 and examining the data flows within the algorithms as those algorithms are executed.

Figure 9:
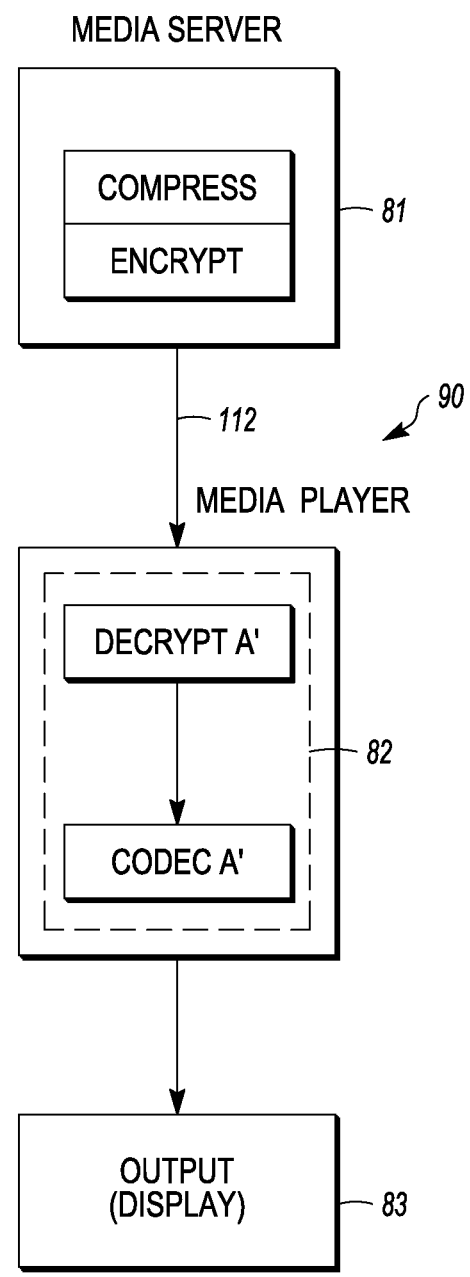
FIG. 9 shows in a first embodiment a streaming media (delivery and reception) system that utilizes obfuscated algorithms and data flows using branch encoding.
Figure 10:
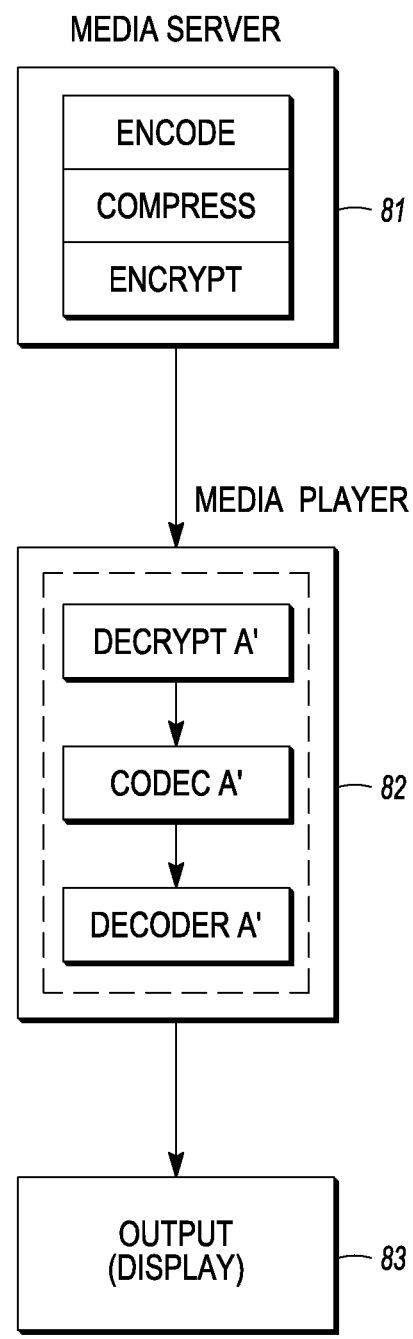
FIG. 10 shows in a second embodiment a streaming media (delivery and reception) system that utilizes obfuscated algorithms and data flows using randomized branch encoding.
Figure 11:
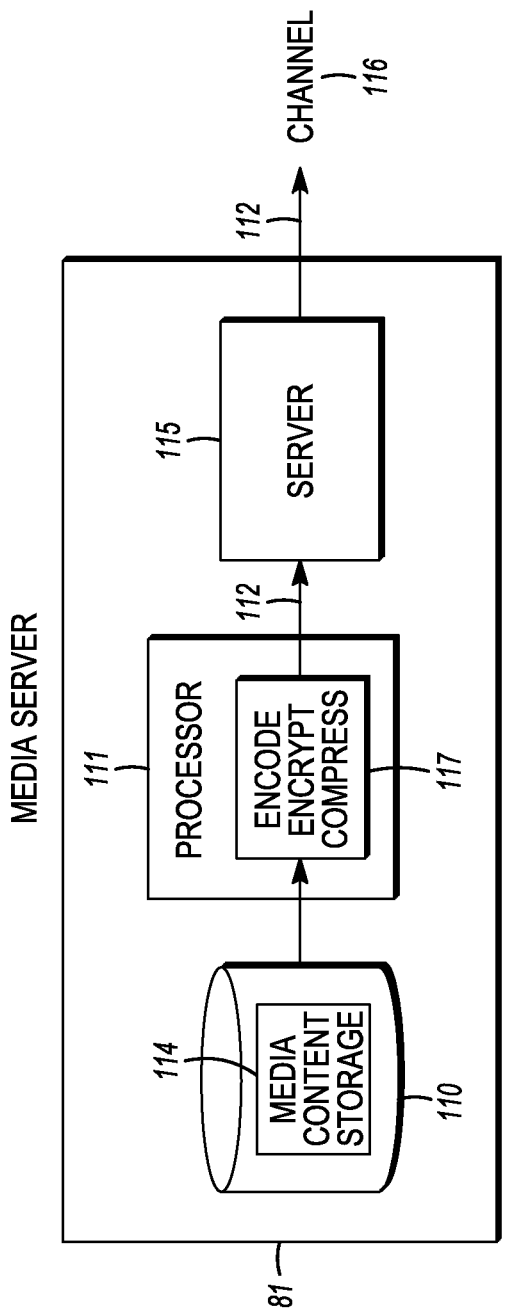
FIG. 11 shows a media server of the streaming media system in more detail.

3.1.1 Media Player with Obfuscated Code that is a Randomized Branch-Encoded Version of Original Program Code FIG. 9 shows a streaming media delivery system 90 utilizing obfuscated code embodying the decryption and codec (decompression) algorithms as described above. Instead of the processor 122 in the media player 82 executing the original program code embodying the decryption and codec algorithms A with functionality F, the processor 122 executes obfuscated program code, which is a transformation of the original program code as described previously. The media server 81 operates in the usual manner. It retrieves the media content 114, generates a media stream 112, encrypts and compresses the media stream 112 and then transmits the compressed and encrypted media stream 112 over the transmission channel 116 using a server, broadcast or other suitable transmission. The encrypted and compressed media stream 112 is received at the media player 82 in the usual manner. The media player 82 executes the obfuscated program code to implement the transformed algorithm A', but which carries out the same decryption and codec functionalities F to decrypt and decompress the media stream 112, and extract the media content 114. The media content output stream 125 is passed to the output device 83 for display of the media content.

If an unauthorized user infiltrates the media player 82 to examine the decryption and codec algorithms A', the obfuscated program code will make it computationally difficult to ascertain the functionality F of the algorithms A'. Likewise, during execution of the obfuscated program code, it will be computationally difficult to examine the data flows and retrieve the media content 114 or reverse engineer the algorithms. This is even though the data flows themselves will be unencrypted. It would be therefore very difficult to obtain the media content 114 from the media player for unauthorized use.

3.1.2 Media Player with Obfuscated Code that is a Randomized Branch Encoded Version of Original Program Code with Randomized Input and Output Encodings In the embodiment of FIG. 9, while the obfuscated code is unintelligible, with persistence, it is possible to reverse engineer the program code functionality by using knowledge of the input data flows and output data flows using dynamic analysis. Even if an adversary cannot determine the decryption and decompression functionality of the obfuscated program code and internal data flows during execution of the program code, the functionality might be determinable (with effort) from the input and output data flows, which the adversary also has access to.

In a further embodiment, the media player executes obfuscated program code that is a randomized branch encoded version of original program code with randomized input encodings and optionally randomized output encodings, in which the code has been adapted to take input data stream with randomized input encodings as described above. That is, the randomized branch encoded version of the original program code comprises randomized input encodings in accordance with the incoming input data streams with randomized encodings according to an encoding process. In this embodiment, the media delivery system functions in the same way as above, except that the media server also encodes the input data stream (as well as encrypting and compressing the input data stream). For example, the encoding process could be to XOR bits of an input data flow with random number bits, the XOR output being the encoded input data flow. This is what is delivered by the media server and is received by the media player. The media player executes the obfuscated program code to generate decrypted and decompressed output data flows from the encoded, encrypted and compressed input data stream. Where there are no randomized output encodings, the output stream is passed to and can be directly played on the output device 83. Where the obfuscated program code comprises randomized output encodings also, a further decoding step is taken at a suitable point, such as in the output device, before the output stream can be played. This makes it much more difficult to reverse engineer the functionality of the obfuscated program code using dynamic analysis. Due to the randomized encodings on the input flows, the output data flows (whether encoded or not) will appear random even if a dynamic analysis of multiple inputs and outputs is undertaken. This makes it difficult for an attacker to ascertain the functionality of the obfuscated program code even using dynamic analysis. Encoding the output stream adds a further level of protection.

3.1.3 Other Variations

Either of the embodiments of FIG. 8 and FIG. 9, the output stream 125 from the media player is uncompressed and unencrypted. This means that someone might extract the media stream 125 between the media player 82 and output device 83 and store and distribute the media content 114 without authorization. This is a less desirable point of access to the media content 114 as the stream is decompressed, but it is still a possibility. In further embodiments, the obfuscated program code embodiments described can be extended to operating further downstream in the system such as in the output hardware, to protect latter parts of the media delivery chain.

3.2 Other Uses for Obfuscated Code

As noted, the above examples are one embodiment only, and there other end uses for the obfuscation transform. In addition to streaming media applications, the obfuscation transform could also be used for (not limiting): Document management systems, where documents are shared between authorised parties. Media or software license management, where verification of licenses is required. Media players in a web browser or other untrusted platform. More generally, a data flow receiver that receives a stream of encrypted data and contain program code to decrypt that stream to provide unencrypted output, or any system on an untrusted platform where the program code needs to obfuscated to hide the functionality from untrusted parties. Those skilled in the art could utilise the transform for other applications such as those above.

4. Derivation of Obfuscation Algorithm

Appendix A that follows shows the obfuscation algorithm used in accordance with embodiments of the present invention was derived.

The invention claimed is:

1. A method of obfuscating program code, the method comprising:
   receiving, at a processor, original program code,
   in the processor, transforming the original program code into obfuscated program code
   by replacing a portion of the original program code that implements at least one logical function with replacement code, the at least one logical function comprising at least one of IDENTITY, AND, NOT, OR XOR, ADD, and MUL, replacement performed by the steps of:
      identifying the at least one logical operation from the original program code;
      identifying at least one constant width randomized branching program associated with the identified at least one logical operation, the at least one constant width randomized branching program defining a plurality of permutations, each permutation implementing the at least one logical operation; and
      generating obfuscated replacement code for the at least one logical operation using one or more selective ones of the plurality of permutations.

2. The method of claim 1 wherein the obfuscated program code provides the same functionality as the original program code.

3. The method of claim 1 wherein the randomized branching program is created by the further step of randomizing the input encodings of layered branching programs.

4. The method of claim 3 wherein the randomized branching program is created by the further step of randomizing the output encodings of the layered branching programs.

5. The method of claim 4 wherein randomizing the input or output encodings comprises modifying layers in the layered branching programs in accordance with:
   randomized encodings on input data flows, and/or
   desired randomized encodings on output data flows.

6. The method of claim 3 further comprising transforming the randomized branching program to program code to form the obfuscated program code, wherein the obfuscated program code provides a different functionality as the original program code to process the input video data flows with randomized encodings.

7. The method of claim 1 wherein the processor implements matrix calculations to implement randomized branch encoding to transform the original program code into obfuscated program code.

8. The method of claim 1 wherein implementing randomized branch encoding comprises creating the original program code functionality using matrix calculations that implement the randomized branch encoding.

9. The method of claim 8 wherein the matrix calculations can be implemented as program code, which is an obfuscated version of the original program code.

10. The method of claim 1, wherein transforming the original program code into obfuscated program code defines a randomized branch encoded version of the original program code without affecting the program control flow and without using encryption or decryption.

* * * * *